Patented Aug. 25, 1942

2,293,761

UNITED STATES PATENT OFFICE 2,293,761

POLYAMIDE SOLUTION

Franklin Traviss Peters, Wilmington, Del., assignor to E. I. du Pont de Nemours & Company, Wilmington, Del., a corporation of Delaware No Drawing. Application July 6, 1939, Serial No. 283,125

4 Claims. (Cl. 260—32)

This invention relates to compositions of matter, and more particularly to new and useful fluid compositions comprising synthetic linear polymers.

This invention has as an object the provision of fluid polyamide compositions useful in making filaments, bristles, ribbons, films, sheets, and coatings on metal, fabric, paper, regenerated cellulose, and the like. Other objects will appear hereinafter.

The synthetic linear polyamides with which this invention is concerned are of the type described in U. S. Patents 2,071,250, 2,071,253, and 2,130,948. It is therefore to be understood that the expression "synthetic linear polyamide," as used hereinafter, designates a polyamide of the said general type. A characteristic property of these polyamides is that they can be formed into filaments which can be cold drawn into fibers showing molecular orientation along the fiber axis. These polyamides are most useful for the preparation of fibers, bristles, ribbons, sheets, foils, and coatings on metal, paper, fabric, regenerated cellulose, and the like. The polyamides are of two types, those derived from polymerizable monoaminomonocarboxylic acids or their amide-forming derivatives, and those derived from the reaction of suitable diamines with suitable dicarboxylic acids or amide-forming derivatives of dibasic carboxylic acids. It will be noted that the polyamides are derived from bifunctional amide-forming reactants and that the amide groups form an integral part of the main chain of atoms in the polymer. On hydrolysis with mineral acids, the polyamides yield monomeric amide-forming reactants. For example, a polyamide derived from a diamine and a dibasic acid yields on hydrolysis with hydrochloric acid the dibasic acid and the diamine hydrochloride.

Although the synthetic linear polyamides as a class are microcrystalline and have fairly high and sharp melting points, they can be formed into many useful objects without the use of solvents. This is accomplished by spinning, extruding, or otherwise forming the object from the molten polyamide. However, there are certain advantages in the use of solutions over molten compositions to achieve the fluid state necessary in lacquers, coating compositions, and dopes suitable for use in forming various objects, such as films, sheets, ribbons, bristles, and filaments. For example, in coating fabrics, paper, or other materials which are charred or tendered by high temperatures, the use of a solution which can be applied and subsequently evaporated to dryness at a relatively low temperature does not cause deterioration of the material being coated. It is often desirable to prepare a fluid composition for use over a period of time, and in that event it is convenient if the composition can be kept in the liquid state by storage at ordinary temperatures. The application of such solutions as lacquers or adhesives is much more easily carried out by methods well known to the art than is the application of a molten composition. Further, the incorporation of plasticizers or other modifying agents into polyamides is frequently more advantageously done by addition of the plasticizer to a solution of the polyamide rather than to a molten polyamide, minimizing the tendency toward discoloration and decomposition which frequently occurs when blending is done with a melt. Further, there is a tendency with certain types of plasticizers and modifying agents to be less compatible at the high temperatures required for blending in a melt, whereas they can be readily incorporated in a polyamide solution at a low temperature. A still further advantage in the use of solutions lies in the ease with which they can be cast into films or coatings of uniform thickness, which is mechanically more difficult to accomplish with a molten composition due to its relatively high viscosity.

The fiber-forming polyamides are generally insoluble in the more common organic solvents but are known to be soluble in phenols and usually in certain organic acids, e. g., formic and acetic. These solvents are of limited utility, however, due to their corrosive nature and tendency to degrade the polymers. Further, although films or coatings can be cast from solutions in these solvents, films flowed or cast in accord with the usual procedure for depositing films are translucent or cloudy and are therefore of limited utility. Among non-acidic organic materials, butanol has been used with some success but since these solutions generally form gels at temperatures below about 80° C., it is necessary to use the solutions at temperatures above 80° C. Other non-acidic organic materials are less effective solvents than butanol. In contrast to butanol, closely related alcohols show little or no solvent action on the polymers with which this application is concerned.

I have now found that unsaturated alcohols, i. e., those containing olefinic or acetylenic linkages, are very active solvents for the above mentioned polymers and that the resulting solutions can be readily cast into clear films, coated on fabrics, metal, paper, and the like at room temperature or slightly higher temperatures. Alcohols other than those of the type just mentioned are relatively ineffective as useful solvents. For example, although secondary butanol has no appreciable solvent action at room temperature on the polyamides with which this invention is concerned, the corresponding acetylenic alcohol, methylethynyl-carbinol, dissolves most of these polymers very readily, usually at room temperature or at temperatures only slightly above room temperature.

In the practice of this invention a variety of unsaturated alcohols can be used. The concentration of the polymers which can be obtained in solution and the viscosity of the solution depend upon the nature of the polymer, the nature of the unsaturated alcohol, and the temperature. This invention is particularly advantageous in connection with interpolyamides, i. e., polyamides derived from a mixture of polyamide-forming compositions, for solutions of high concentration can be obtained from them. Of the simple polyamides, the most soluble are those having hydrocarbon radicals as lateral substituents, as for instance, polyamides derived from such dibasic acids as β-methyl adipic acid, β-tertiary butyl adipic acid, and diamines such as 3-methyl hexamethylene diamine, and 2-tertiary butyl hexamethylene diamine. Among the unsaturated alcohols that may be used as solvents, those containing acetylenic linkages have the greatest solvent power. Still more active solvents for polyamides can be obtained by adding small amounts of water to the unsaturated alcohols, as little as 0.5% water greatly enhancing the solvent power. It is also frequently useful to add diluents, which have no tendency to increase the solvent action of the unsaturated alcohol but may aid in promoting the clarity of objects formed by evaporation of the solvents, or may act as blending agents for the polyamide and plasticizers or other modifying agents. Aromatic hydrocarbons, e. g., toluene, are particularly useful diluents for these compositions.

In most cases the polymer solutions can be conveniently prepared by agitating the polymer with the solvent at room temperature or at slightly higher temperatures, although it is frequently advantageous to agitate the polymer with the solvent at the boiling point of the solvent under a reflux condenser. A given solvent may have only a swelling action on a given polymer at room temperature, forming a rigid or nonfluid gel. A gel of this type can usually be dispersed to a fluid solution by heating to a minimum temperature which varies with the nature of the composition. Solutions prepared in this manner will solidify again to a gel after cooling to room temperature or below the minimum temperature required to effect solution originally. The time interval which elapses before a gel is formed varies with the nature of the polymer, the solvent, plasticizers, and other materials present in the composition. In some cases such super-cooled solutions can be handled at room temperature for as long as several days before gel formation occurs. In other cases, a gel may be formed within several minutes after cooling to room temperature. For uses in which great stability of the solutions against gelation is desired, e. g., when it is desirable to use the solution at room temperature over a long period of time, the addition of a small amount of water to the unsaturated alcohol solvent will increase the length of time during which the solution remains fluid at room temperature and will in many cases entirely prevent gelation. However, it is sometimes an advantage to use an unstable solution to form films, fibers, coatings, or other objects by a process involving solvent evaporation. For example, if a solution is cooled to temperatures in the range where gel formation can eventually occur but is sufficiently delayed to permit the casting, coating, or desired manipulation to be carried out while the composition is still fluid, the solution will usually have a higher viscosity in this unstable condition than at the temperatures where gel formation cannot occur. The increased viscosity is of particular advantage when the solutions are cast or applied as thick coatings or films since a viscous coating will maintain its shape in the time interval required for solvent evaporation to produce a self-supporting coating or film. It is frequently possible by continued agitation of a super-cooled solution to prevent the formation of a gel at temperatures below which gel formation would otherwise occur, and this procedure can be used to advantage in practicing the present invention.

This invention is described more specifically in the following examples, in which parts are expressed by weight.

*Example I*

One hundred eighty (180) parts of an interpolymer (intrinsic viscosity 1.15) prepared from equimolecular quantities of hexamethylenediammonium adipate and decamethylenediammonium sebacate was dissolved in 720 parts of isopropylethynylcarbinol,

$(CH_3)_2CH-CHOH-C\equiv CH$ by heating and stirring. The solution was cooled to room temperature and was used as a lacquer for coating wire.

*Example II*

One hundred (100) parts of an interpolymer (intrinsic viscosity 1.10) prepared from equimolecular quantities of hexamethylenediammonium adipate and decamethylenediammonium sebacate was stirred and heated with 630 parts of methylethynylcarbinol, $CH_3CHOH-C\equiv CH$, until a smooth solution was obtained. To this solution was then added 247 parts of a pigment dispersion containing plasticizers and consisting of 90 parts of methylethynylcarbinol, 77 parts of a mixture of solid pigments, 40 parts of the mixture of N-ethyl-para and ortho toluenesulfonamides known commercially as Santicizer #8, and 40 parts of dihydroabietyl alcohol. The pigmented solution was cooled to room temperature and used for coating fabric.

*Example III*

Two (2) parts of an interpolyamide (intrinsic viscosity 0.89) prepared from hexamethylenediammonium adipate and caprolactam in the weight ratio of 2 to 3 was dissolved in 8 parts of allyl alcohol by heating at 50° C. The solution was cooled to room temperature and then flowed in a uniform layer on a glass plate by means of a doctor knife set at 0.0085″. The solvent was allowed to evaporate at room temperature until a film that was dry to the touch was obtained (about five minutes). Traces of solvent were then removed from the film by heating at 100° C. for thirty minutes. The film, which could be readily stripped from the glass plate, was transparent, pliable, tough, and could be readily cold drawn.

Example IV

An ester-amide interpolymer (intrinsic viscosity 0.63) was prepared from 20 parts of hexamethylenediammonium adipate and 80 parts of an equimolecular mixture of ethylene glycol and sebacic acid. Seventy-five (75) parts of this polymer was agitated with 435 parts of methylethynylcarbinol,

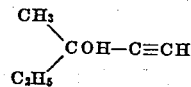

until a smooth solution was obtained. Films cast from this solution by a procedure similar to that described in Example III were transparent and tough, and had a tensile strength of 1620 lbs. per square inch (based on original dimensions) and an elongation of 480% when tested at 77° F. and 50% relative humidity.

Example V

An interpolymer was prepared from 30 parts of hexamethylenediammonium adipate and 70 parts of an equimolecular mixture of ethylene glycol and adipic acid. Ten (10) parts of this polymer was stirred and heated with 30 parts of methallyl alcohol, $CH_2=C(CH_3)-CH_2OH$, until a smooth solution was obtained. When this solution at 50° C. was cast by means of a doctor knife on a metal plate heated to 50° C. and the solvent allowed to evaporate, tough, pliable films were obtained.

Example VI

One (1) part of a polyamide (intrinsic viscosity 0.36) prepared from 3-tertiary butyl hexamethylenediamine and beta-tertiary butyl adipic acid was dissolved in 4 parts of methylethynylcarbinol at 50° C. The solution was cooled to room temperature and then applied with a brush as a clear lacquer over metal, wood, and glass surfaces.

Example VII

The following table describes solutions of an interpolymer (intrinsic viscosity 1.00), derived from hexamethylenediammonium adipate and caprolactam in the weight ratio of 3 to 2, in unsaturated alcohols containing varying amounts of water as a stabilizer against gelation. These solutions were prepared by heating the polymer and the solvents at 60° C., and after the polymer was completely dissolved the solutions were cooled to room temperature and the time elapsing before gelation occurred was noted:

| Polymer | Unsaturated alcohol | Water | Time before gelation |
|---|---|---|---|
| Per cent | | Per cent | |
| 10 | 90% methallyl alcohol | 0 | About 2 hours. |
| 10 | 89% methallyl alcohol | 1 | Still fluid after 2 months. |
| 10 | 90% allyl alcohol | 0 | About 3 hours. |
| 10 | 89% allyl alcohol | 1 | About 24 hours. |
| 10 | 75% allyl alcohol | 15 | Still fluid after 10 days. |
| 10 | 45% allyl alcohol | 45 | Not completely soluble; dissolved portion gelled in about 2 hours. |

As examples of additional synthetic linear polyamides which can be dissolved in unsaturated alcohols may be mentioned those derived from the combination of a dibasic carboxylic acid and a diamine, both of which reactants are substituted with at least one alkyl group in the hydrocarbon chain. Interpolyamides derived from the combination of two or more diamines with two or more dibasic acids are particularly well adapted to the preparation of these solutions. As examples of polyamides of this type which may be used may be mentioned those derived from the combination of any two or more of the following diamines with any two or more of the following dibasic acids:

| | |
|---|---|
| Tetramethylenediamine | Adipic acid |
| Pentamethylenediamine | Sebacic acid |
| Hexamethylenediamine | Suberic acid |
| Octamethylenediamine | Carbonic acid |
| Decamethylenediamine | Azelaic acid |
| p-Xylylenediamine | |
| m-Phenylenediamine | |
| 3,3'-diaminodipropyl ether | |

The interpolyamides derived from a combination of a polymerizable monoaminomonocarboxylic acid or one of its amide-forming derivatives with one or more diamines and one or more dibasic carboxylic acids are also excellently adapted to the preparation of solutions of the type described in this invention. As examples of polyamides of this type which may be used may be mentioned those derived from the combination of 6-aminocaproic acid, 9-aminononanoic acid, 11-aminoundecanoic acid or one of their amide-forming derivatives with each other or with combinations of one or more of the diamines mentioned in the table just preceding and with one or more of the dibasic acids mentioned in the same table.

In addition to using the polyamides mentioned above which are obtainable from bifunctional polyamide-forming reactants, as essentially sole reactants, the use of modified linear polyamides obtained by including with polyamide-forming reactants other bifunctional reactants, such as glycols, has been described in Examples IV and V. Although these products contain ester linkages, they can still be referred to as polyamides, since they contain a plurality of amide linkages and retain many of the desirable properties of the simple polyamides. As additional examples of such modified polyamides which can be dissolved in unsaturated alcohols may be mentioned the interpolymers derived from the combination of hexamethylenediammonium adipate with ethylene glycol and sebacic acid, hexamethylenediammonium adipate with diethylene glycol and adipic acid, hexamethylenediammonium adipate with dimethyldimethylolmethane and adipic acid, hexamethylenediammonium sebacate with ethylene glycol and sebacic acid, and decamethylenediammonium sebacate with ethylene glycol and sebacic acid. Further examples of modified polyamides to which the present invention is applicable are those derived from amino acids, dibasic acids and glycols; and those derived from amino acids and hydroxy acids. In general, the synthetic linear superpolymers do not possess fiber-forming properties unless they have an intrinsic viscosity above 0.4. Therefore, to be useful in making fibers or likewise in making films, ribbons, tough coatings, etc., the polyamide should have an intrinsic viscosity above 0.4 and preferably above 0.6. The expression, intrinsic viscosity, is to be understood in accordance with the definition thereof contained in U. S. Patent 2,130,948.

As additional examples of unsaturated alcohols which may be used as solvents to prepare polyamide solutions may be mentioned 3-hydroxy-butene-1, propargyl alcohol, ethylethynyl-carbinol, beta-ethynylethanol, and cinnamyl alcohol.

The properties of objects formed from the compositions described herein may be modified and are frequently greatly improved by the addition of plasticizers and pigments. The compositions of this invention may also contain other types of modifying agents, such as resins, cellulose derivatives, and other film-forming materials, waxes, water-repellents, luster modifying agents, dyes, antioxidants, oils, antiseptics, etc.

Solutions of polyamides in volatile unsaturated alcohols are useful for forming a variety of objects by a process of solvent evaporation. Typical objects which can be formed from these solutions by solvent evaporation are fibers, filaments, bristles, surgical sutures, fishing leaders, fishline, dental floss, films, ribbons, sheets, safety glass interlayers, golf ball covers, and plasticized or otherwise modified solid compositions useful in making molded articles. The solutions are useful for application as lacquers on wood, metal, glass, and other surfaces, for coating wire, fabrics, paper, regenerated cellulose, and the like, and for impregnating fabric, paper, etc.

The advantages which these solutions possess over synthetic linear polyamide solutions previously proposed in the art are that they are substantially noncorrosive, fluid at relatively low temperatures, and can be evaporated at relatively low temperatures to form transparent, homogeneous films, fibers, or other objects.

As many apparently widely different embodiments of this invention may be made without departing from the spirit and scope thereof, it is to be understood that I do not limit myself to the specific embodiments thereof except as defined in the appended claims.

I claim:

1. A composition of matter comprising a solution of synthetic linear polyamide in an unsaturated alcohol; the said polyamide being the reaction product of a polymer-forming composition comprising a diamine, a dibasic carboxylic acid and a monoaminomonocarboxylic acid.

2. A composition of matter comprising a solution of synthetic linear polyamide in an unsaturated alcohol, the said polyamide being the reaction product of a polymer-forming composition comprising hexamethylenediammonium adipate and caprolactam.

3. The solution set forth in claim 1 wherein the said unsaturated alcohol is an allyl alcohol.

4. The solution set forth in claim 1 wherein the said unsaturated alcohol is an ethynylcarbinol.

FRANKLIN TRAVISS PETERS.